July 9, 1957  J. V. DADD  2,798,678
SELF-GRIPPING MANDREL
Filed Dec. 3, 1953

INVENTOR
John V. Dadd

BY Johnson and Kline
ATTORNEYS

United States Patent Office 2,798,678
Patented July 9, 1957

2,798,678
SELF-GRIPPING MANDREL

John V. Dadd, Glen Cove, N. Y., assignor to Columbia Ribbon and Carbon Manufacturing Company, Inc., Glen Cove, N. Y., a corporation of New York Application December 3, 1953, Serial No. 396,029

1 Claim. (Cl. 242—68)

This invention relates to mandrels adapted to fit into and grip hollow bodies such as tubes, hollow cores or the like, as for the purpose of rotating the tubes to wind or unwind paper, cord or other material.

Heretofore self-gripping mandrels have been constructed for supporting and turning tubes or other hollow objects, comprising essentially a tube support or tube support having sloping-walled recesses carrying knurled rods so arranged that relative movement between the mandrel and the tube will cause the knurled rods to ride up on the sloping walls and wedge tightly against the inside surface of the tube. These prior mandrels are not wholly satisfactory for the reason that whenever there is slippage of the knurled rod the knurling cuts away the sloping wall of the mandrel, ultimately rendering the device inoperative. Moreover, usually the tube support of such a mandrel is made of soft metal such as aluminum and the rods made of steel, in order that there may be a good gripping action between the rods and the tube support. While this construction initially is effective because of the bite of the knurling on the sloping wall, the advantage is lost when heavy forces are encountered since the knurled rods turn and act as cutters, quickly wearing away the softer aluminum stock and rendering the mandrel inoperative.

The above disadvantage of this prior type of self-gripping mandrel is overcome by the present invention, and an object of the invention is to provide an improved self-gripping mandrel wherein slippage of the wedging rods is positively prevented at all times, and wherein there is eliminated entirely any likelihood of cutter action or wearing away of the mandrel tube support by the wedging rods.

Another object of the invention is to provide an improved self-gripping mandrel as above set forth, which is simple in construction, economical to fabricate, and extremely reliable in use, providing an effective gripping action on the tube or core which prevents any possible slippage.

In accomplishing these objects I provide, in the specific embodiment of the invention illustrated herein, a novel mandrel construction comprising a tube support having a plurality of recesses in its peripheral surface, the walls of which are provided with gear teeth. Carried in the recesses are wedging rods made of pinion rod stock, the wedging rods being arranged to mesh with the gear teeth on the walls of the recesses. Thus there is provided a positive non-slip, gripping action between the wedging rods and the recess walls, eliminating any possibility of relative sliding movement which might cut or otherwise deform the tube support to render the mandrel inoperative.

Other features and advantages will hereinafter appear.

Figure 1:
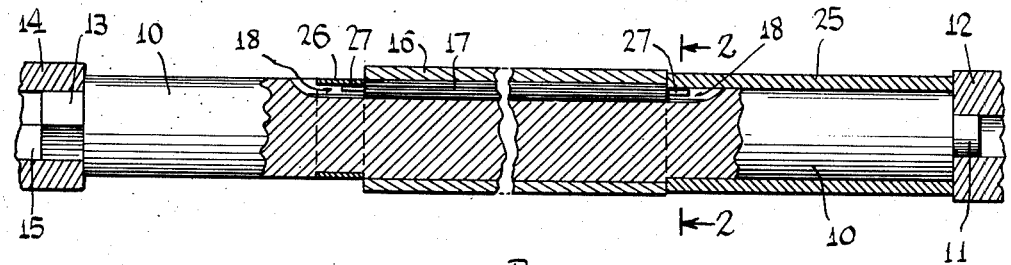
Figure 1 is an axial sectional view of the improved mandrel of this invention.
Figure 2:
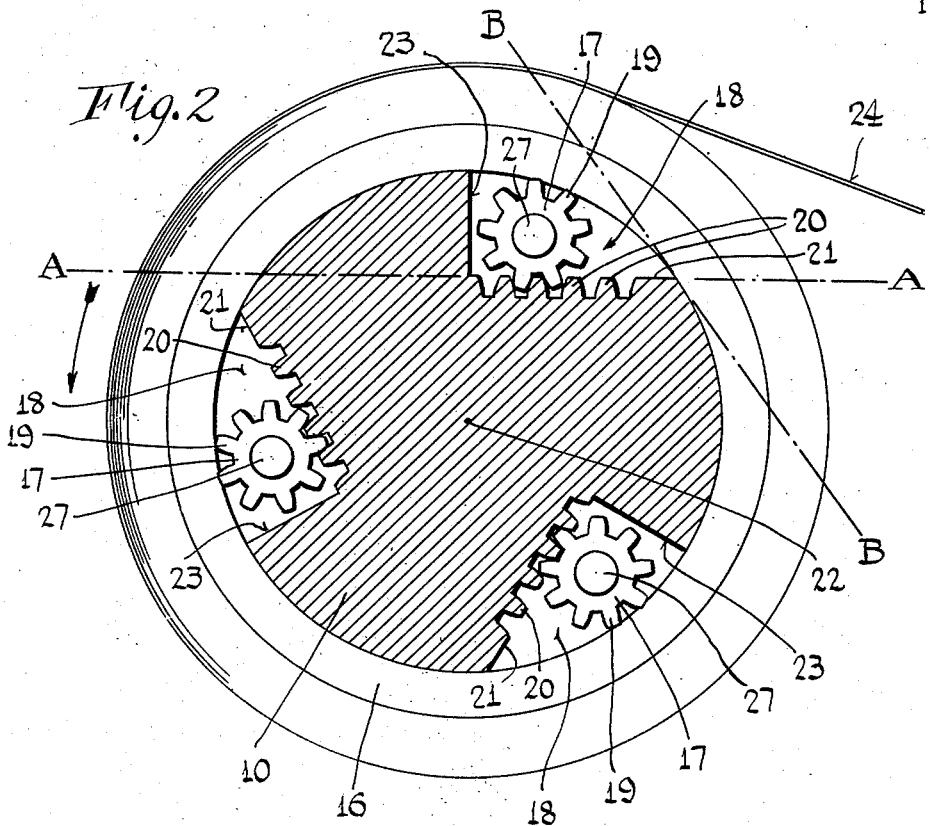
Fig. 2 is a transverse sectional view taken on line 2—2 of Fig. 1.

The mandrel shown in Figs. 1 and 2 comprises a substantially cylindrical tube support 10 of a diameter to fit snugly within the tube to be carried thereby which may be of any suitable material, as for example aluminum, steel or other metal or composition. The tube support 10 is mounted for rotation by a stub shaft or pintle 11 at one end, accommodated in a bearing 12. At its other end the tube support 10 has a square driving projection 13 received in and carried by a hollow spindle 14 having a corresponding square-section bore 15.

According to the present invention I provide novel semi-automatic clutch or gripping means on the tube support 10, arranged to engage the interior walls of a tube or hollow core 16 carried on the mandrel to provide an effective one-way drive connection thereto which will not slip or result in wearing and failure of the parts and which may be easily and quickly released, and will permit facile insertion of the mandrel in the tube or removal of the tube from the mandrel. This means, as shown in Fig. 2, comprises a plurality of rollers or wedging rods 17 carried in recesses 18 provided in the essentially cylindrical peripheral surface of the tube support 10, and comprises preformed interlocking means on the rods and walls of the recesses. This means, as shown herein, includes teeth 19 on the wedging rods, and accordingly the rods may be advantageously formed from pinion rod or wire. Cooperable with the teeth 19 of the rods to prevent slippage in the recesses, and constituting a part of said preformed interlocking means are teeth 20 on walls 21 of the recesses, the teeth 20 and 19 meshing with each other and preferably being of flat-ended, involute outline as shown in Fig. 2. As seen in Fig. 1 the recesses 18 extend longitudinally with respect to the tube support 10, as do the teeth 20 in the walls 21 of the recesses. In order to provide for a proper wedging action between the wedging rods 17 and the tube or core 16, each wall 21 of the recesses slopes or extends inward from the peripheral surface of the tube support along the plane, such as the plane A—A of Fig. 2 which has the axis 22 of the mandrel spaced behind it. In other words, the plane A—A is seen to make an acute angle with a tangent plane B—B of the peripheral surface at the point where the wall 21 emerges, said angle being measured on the side of the intersection of said planes at which the recess 18 is disposed. The recesses 18 have other walls 23 which may be advantageously disposed substantially at right angles to the walls 21 and which may have a depth on the same order of magnitude as the diameter of the wedging rods 17 so that when the rods are in retracted positions in the recesses 18 they will not appreciably project beyond the periphery of the tube support 10.

In Fig. 2, the tube or core 16 is shown as carrying a roll of sheet material 24 which is being wound on the core, and the latter is being driven in a counterclockwise direction by similar turning movement of the tube support 10 of the mandrel. The wedging rods 17, by virtue of their engagement with the inside walls of the tube or core 16, are made to roll outward along the walls 21 until they are firmly wedged and prevented from further movement by the forces imposed on them by the tube. The teeth 19 of the rods may be partially imbedded in the inner wall of the tube 16 if the latter is of relatively soft or yieldable material such as paper, cardboard or the like. When it is desired to disengage the tube or core 16 from the tube support 10 for removal, it is merely necessary to turn the tube slightly in a counterclockwise direction with respect to the tube support 10, whereupon the wedging rods 17 will be rolled deeply into the recesses 18, releasing the tube 16 for easy removal.

It will be appreciated that, by the provision of the meshing teeth 19 and 20 on the rods 17 and walls 21 there is positively prevented any slippage between the rods and the tube support 10, and therefore the tube support cannot be cut away or abraded in any manner by the rods. However, the teeth 19 provide an effective gripping action in connection with the core 16, since they may imbed themselves in the inner wall of the core, thereby firmly securing the core to the mandrel against relative turning in one direction.

For the purpose of retaining the pinion rods 17 in the recesses 18, retainer strips in the form of collars 25 and 26 may be provided on the tube support 10, overlying portions of the recesses 18. The pinion rods 17 may have protuberances or pins 27 projecting from their ends and disposed within the collars 25 and 26 for engagement therewith. By this arrangement a limited movement of the pinion rods 17 is permitted, enabling them to be laterally projected beyond the peripheral surface of the tube support 10 for purposes of gripping the core 16 while at the same time the pinion rods are securely retained in place. The collar 26 may be recessed in the tube support 10 so as to be flush therewith, thereby to enable the core 16 to be removed from the mandrel by slipping it past the left end of the shank as viewed in Fig. 1.

While I have shown in Figs. 1 and 2 pinion rods disposed in elongate recesses in the tube support 10, it will be appreciated that the pinion rods function in the manner of rollers or toothed wheels, and the lengths of the rods 17 and recesses 19 may be shorter or longer, as desired, to suit different conditions, without departing from the spirit of the invention.

Variations and modifications may be made within the scope of the claim and portions of the improvements may be used without others.

I claim:

A mandrel adapted to fit into and grasp a hollow tubular body, comprising an elongate substantially cylindrical tube support having a recess in its periphery, one wall of said recess being defined by a non-radial longitudinal plane intersecting said periphery at an acute angle, said wall having spaced flat-ended, involute toothed means constituting a rack, a longitudinal rod in said recess having complementary flat-ended, involute toothed means and constituting a pinion movably engageable with said rack and firmly interlocked therewith in all engaged positions, said pinion being rollable on said rack to a position where it projects beyond the periphery of said cylinder and wedgingly engages with its flat-ended, involute toothed means the inside surface of the hollow body when the latter is on the mandrel, thereby preventing slippage of the rod along the recess wall and holding the body against turning movement in one direction relative to the mandrel.

References Cited in the file of this patent

UNITED STATES PATENTS

| | | |
|---|---|---|
| 1,122,627 | Milne | Dec. 29, 1914 |
| 1,973,980 | Graffenberger | Sept. 18, 1934 |
| 2,053,815 | De Panthou et al. | Sept. 8, 1936 |
| 2,161,061 | Keyes | June 6, 1939 |
| 2,645,431 | Cozzo | July 14, 1953 |